United States Patent
McArdle (10) Patent No.: US 8,297,139 B2
(45) Date of Patent: Oct. 30, 2012

(54) DEVICE FOR PRECISELY MANIPULATING OBJECTS

(75) Inventor: Eamon Joseph McArdle, Bergamo (IT)

(73) Assignee: Willcox Investments S.A., Luxembourg (LU)

( * ) Notice: Subject to any disclaimer, the term of this patent is extended or adjusted under 35 U.S.C. 154(b) by 446 days.

(21) Appl. No.: 12/714,594

(22) Filed: Mar. 1, 2010

(65) Prior Publication Data
US 2011/0052358 A1  Mar. 3, 2011

(30) Foreign Application Priority Data
Mar. 2, 2009  (EP) .................................. 09154146

(51) Int. Cl.
*F16H 21/00* (2006.01)
(52) U.S. Cl. ............................... 74/27; 74/55; 414/589
(58) Field of Classification Search ................ 74/27, 55, 74/56, 57, 490.1, 490.07, 490.09, 490.13, 74/337.5, 567, 569; 901/16, 17, 12; 414/741.9, 414/590, 589; 254/97, 100, 103; 269/909, 269/289, 229, 231
See application file for complete search history.

(56) References Cited

U.S. PATENT DOCUMENTS

| | | | | |
|---|---|---|---|---|
| 2,611,912 A * | 9/1952 | Maciejowski et al. | ............ | 12/20 |
| 2,747,417 A * | 5/1956 | Brown | ............... | 74/57 |
| 3,290,766 A | 12/1966 | De Coye De Castelet | | |
| 3,655,070 A * | 4/1972 | Haydu | ........................ | 198/621.1 |
| 3,703,834 A * | 11/1972 | Beezer | ........................ | 74/57 |
| 3,779,089 A * | 12/1973 | Beezer | ........................ | 74/53 |
| 3,865,253 A * | 2/1975 | Healy | ........................ | 414/627 |
| 3,869,924 A * | 3/1975 | Beezer | ........................ | 74/24 |
| 3,885,662 A * | 5/1975 | Schaefer | ........................ | 400/161.5 |
| 3,910,422 A * | 10/1975 | Zierpka | ........................ | 198/621.3 |
| 4,002,245 A * | 1/1977 | Mink | ........................ | 414/739 |
| 4,293,268 A * | 10/1981 | Mink | ........................ | 414/591 |
| 4,363,395 A * | 12/1982 | Mink | ........................ | 198/773 |
| 4,452,103 A * | 6/1984 | Lijewski et al. | ............... | 74/817 |
| 4,599,909 A * | 7/1986 | Koller | ........................ | 74/27 |
| 4,811,834 A * | 3/1989 | Asano et al. | ............... | 198/621.1 |
| 5,181,442 A | 1/1993 | Nezu | | |
| 5,345,831 A * | 9/1994 | Sandrock | ........................ | 74/53 |

(Continued)

FOREIGN PATENT DOCUMENTS
EP  0366594  5/1990
(Continued)

*Primary Examiner* — Troy Chambers
*Assistant Examiner* — Valentin Craciun
(74) *Attorney, Agent, or Firm* — Shoemaker and Mattare (57) ABSTRACT

A device for precisely manipulating objects by means of multidimensional tooling movement cycles, comprising a revolving shaft assembly, a barrel shaped main cam connected in a slidable but rotationally locked manner with the revolving shaft assembly, a fixed main cam follower configured to engage the main cam such that the main cam performs a cyclic main translational movement in the direction of a shaft rotation axis, a plate shaped secondary cam rigidly connected to the main cam, a tooling holder having a main slide slidable in the direction of the shaft rotation axis and a secondary slide slidable with respect to the main slide in a transversal direction to the shaft rotation axis, wherein the main slide is connected to the main cam and a secondary cam follower is connected to the secondary slide.

18 Claims, 5 Drawing Sheets

U.S. PATENT DOCUMENTS

| | | | |
|---|---|---|---|
| 5,904,065 A * | 5/1999 | Koller et al. | 74/57 |
| 5,943,915 A * | 8/1999 | Kato | 74/490.09 |
| 6,098,478 A * | 8/2000 | Sandrock | 74/53 |
| 6,598,733 B2 * | 7/2003 | Kato | 198/750.1 |
| 7,451,869 B2 * | 11/2008 | Kato et al. | 198/750.8 |
| 2005/0261105 A1 * | 11/2005 | Kato | 475/331 |
| 2011/0100144 A1 * | 5/2011 | Neelakantan et al. | 74/473.36 |
| 2012/0167701 A1 * | 7/2012 | Howard et al. | 74/55 |

FOREIGN PATENT DOCUMENTS

| | | |
|---|---|---|
| EP | 1413387 | 4/2004 |
| JP | 2003120777 | 4/2003 |

\* cited by examiner

FIG. 8

DEVICE FOR PRECISELY MANIPULATING OBJECTS

BACKGROUND OF THE INVENTION

The present invention relates in general to devices for precisely manipulating objects and particularly to a device for manipulating objects in the medical device or pharmaceutical industry, such as a pick and place device, an item handling device or an item assembling and/or mounting, pressing, cutting, portioning device.

Such devices for precisely manipulating objects are required to repeatably and continuably perform a manipulating cycle, e.g. a pick and place cycle such as an assembling cycle, with high precision, high speed (manipulation rate) and, at the same time, with extremely low maintenance requirements.

Moreover, the manipulation of objects usually require synchronized multidimensional tooling movements of a single tool and in some cases even synchronized multidimensional tooling movements of two or more tools provided to manipulate objects, e.g. assemble medical devices.

Known mechanical and electromechanical devices for precisely manipulating objects, e.g. unidimensionally operating cam controlled tools such as positioning or pressing devices, are usually sufficiently sturdy and low maintenance, but their co-operation with other mechanical or electromechanical devices to obtain synchronized multidimensional tooling movements of one or more tools, usually involves inertial delays, mechanical tolerances and play resulting in a significant loss of precision and synchronization of the multidimensional tooling movements.

Known electronically and sensor controlled manipulating devices are able to correct tooling movement errors due to inertial delays and mechanical tolerances and play, but such devices have yet a very high cost and comparatively low manipulating rate.

The aim of the present invention is therefore to provide a device for precisely manipulating objects with multidimensional tooling movements having features which overcome the drawbacks cited with reference to the prior art.

Within the general scope of the above aim, a particular aim of the present invention is to propose a device for precisely manipulating objects which allows for high rate repetition high precision multidimensional tooling movement cycles at comparatively low production cost and operation cost and low maintenance requirements.

Those and other objects are achieved by a device for precisely manipulating objects according to annexed claim 1.

SUMMARY OF THE INVENTION

According to an aspect of the invention, the device for precisely manipulating objects by means of multidimensional tooling movement cycles comprises:
  a support structure,
  a revolving shaft assembly supported by the support structure such that the revolving shaft assembly can rotate around a shaft rotation axis,
  drive means connected to the support structure and configured to co-operate with the revolving shaft assembly to rotate the revolving shaft assembly around the shaft rotation axis,
  a barrel shaped main cam connected in a slidable but rotationally locked manner with the revolving shaft assembly such that the main cam can slide along the revolving shaft assembly in the direction of the shaft rotation axis and rotates together with the revolving shaft assembly around the shaft rotation axis, wherein the main cam comprises a main cam profile extending around the revolving shaft assembly and defining a stroke in the direction of the shaft rotation axis,
  a fixed main cam follower connected to the support structure and configured to engage the main cam profile of the main cam in such a way that, in response to a rotation of the revolving shaft around the shaft rotation axis, the main cam performs a cyclic main translational movement in the direction of the shaft rotation axis,
  a plate shaped secondary cam rigidly connected to the main cam in a manner that the secondary cam rotates and translates together with the main cam, wherein the secondary cam comprises a secondary cam profile extending around the revolving shaft assembly and defining a stroke in a transversal direction to the shaft rotation axis,
  a tooling holder comprising a main slide supported by the support structure in a manner that the main slide can move in the direction of the shaft rotation axis and a secondary slide having a tooling fixation portion and being connected to the main slide in a manner that the secondary slide can move with respect to the main slide in the transversal direction to the shaft rotation axis,
wherein the main slide is connected to the main cam in a manner that the main slide moves together with the main cam in the direction of the shaft rotation axis and the main cam can rotate with respect to the main slide around the shaft rotation axis,
  a secondary cam follower connected to the secondary slide and configured to engage the secondary cam profile of the secondary cam in such a way that, in response to the rotation of the revolving shaft around the shaft rotation axis, the secondary slide performs a cyclic secondary translational movement in the transversal direction to the shaft rotation axis synchronized with said cyclic main translational movement in the direction of the shaft rotation axis.

In this way, a mechanically timed high precision synchronized multidimensional tooling movement (main translational movement and secondary transversal translational movement) is achieved which has movement magnitudes directly determined by the strokes of the main cam and the secondary cam rigidly connected to one another.

These and other objects and advantages of the present invention shall be made apparent from the accompanying drawings and the description thereof, which illustrate embodiments of the invention and, together with the general description of the invention given above, and the detailed description of the embodiments given below, serve to explain the principles of the present invention.

DETAILED DESCRIPTION OF EMBODIMENTS

Figure 1:
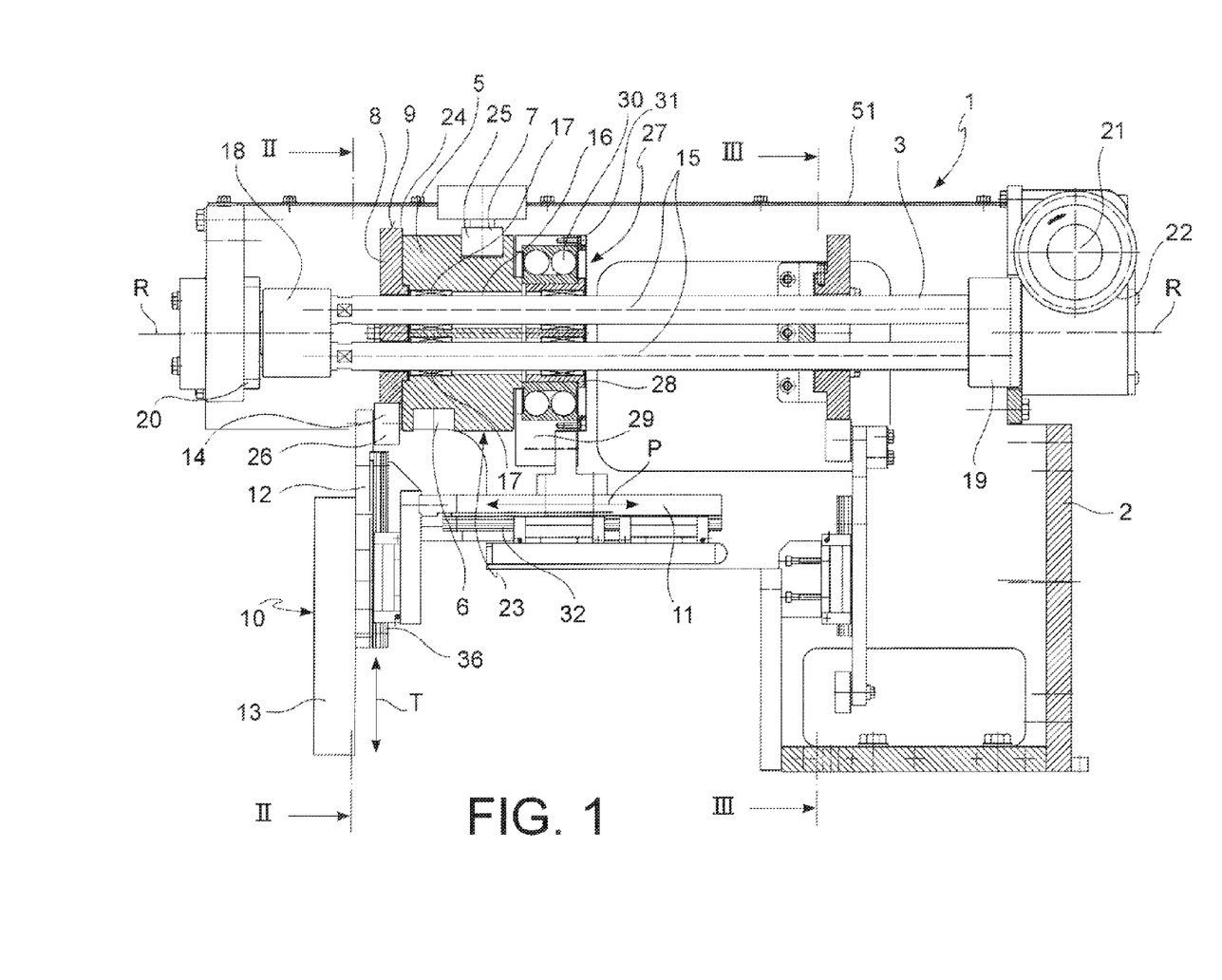
FIG. 1 is a schematic longitudinal cross-sectional view of a device for precisely manipulating objects according to an embodiment of the invention.

Referring to the drawings where like numerals denote like components throughout the several views, FIG. 1 depicts a device 1 for precisely manipulating objects by means of multidimensional tooling movement cycles.

Device 1 comprises a support structure 2, preferably a steel or aluminium frame, and a revolving shaft assembly 3 supported by the support structure 2 such that the revolving shaft assembly 3 can rotate around a shaft rotation axis R. Drive means 4 are connected to the support structure 2 and configured to co-operate with the revolving shaft assembly 3 to rotate the revolving shaft assembly 3 around the shaft rotation axis R. A barrel shaped main cam 5 is connected in a slidable but rotationally locked manner with the revolving shaft assembly 3 such that the main cam 5 can slide along the revolving shaft assembly 3 in the direction of the shaft rotation axis R and rotates together with the revolving shaft assembly 3 around the shaft rotation axis R, wherein the main cam 5 comprises a main cam profile 6 extending around the shaft rotation axis R and defining a main stroke in the direction of the shaft rotation axis R.

A fixed main cam follower 7 is connected to the support structure 2 and configured to engage the main cam profile 6 of the main cam 5 such that, in response to a rotation of the revolving shaft assembly 3 around the shaft rotation axis R, the main cam 5 performs a cyclic main translational movement P in the direction of the shaft rotation axis R.

A plate shaped secondary cam 8 is rigidly connected to the main cam 5 such that the secondary cam 8 rotates and translates together with the main cam 5. The secondary cam 8 comprises a secondary cam profile 9 extending around the shaft rotation axis R and defining a secondary stroke in a transversal, e.g. radial, direction to the shaft rotation axis R.

The device 1 further comprises a tooling holder 10 with a main slide 11 supported by the support structure 2 in a slidable and guided manner such that the main slide 11 can move in the direction of the shaft rotation axis R (which can coincide with the horizontal direction) and with a secondary slide 12 having a tooling fixation portion 13 and being connected to the main slide 11 in a slidable and guided manner such that the secondary slide 12 can move with respect to the main slide 11 in a transversal direction to the shaft rotation axis R (which can coincide with the vertical direction).

The main slide 11 is connected to the main cam integrally in translation along shaft rotation axis R and rotatably around said shaft rotation axis R such that the main slide 11 moves together with the main cam 5 in the direction of the shaft rotation axis R while the main cam 5 can freely rotate with respect to the main slide 11 around the shaft rotation axis R.

A secondary cam follower 14 is connected to the secondary slide 12 and configured to engage the secondary cam profile 9 of the secondary cam 8 in such a way that, in response to the rotation of the revolving shaft assembly 3 around the shaft rotation axis R, the secondary slide 12 performs a cyclic secondary translational movement T in the transversal direction to the shaft rotation axis R. Thanks to the rigid connection between the main and secondary cams 5, 8, precisely synchronized and timed main and secondary cyclic translational movements P,T of the tooling fixation portion 13 of the secondary slide 12 are obtained.

In accordance with an embodiment, the revolving shaft assembly 3 comprises two shaft ends 18, 19 rotatably supported in the support structure 2, e.g. by means of tapered roller bearing supports 20. Drive means 4 may comprise an electric, pneumatic or hydraulic motor 21 in dependency from the specific environment of application of device 1, as well as a transmission 22 for transmitting the rotational movement of a motor output shaft to the revolving shaft assembly 3. The transmission 22 may comprise a timing belt connected with a toothed gearing interposed between the motor 21 output shaft and the revolving shaft assembly 3, in order to rotate the revolving shaft assembly 3 at a precise speed which in turn determines the tooling movement rate.

The revolving shaft assembly 3 may comprise a plurality of parallel single rods 15 extending along shaft rotation axis R and spaced apart from one another transversely to shaft rotation axis R. The single rods 15 have a circular cross-section and are slidably received, preferably with interposition of sliding bearings 17, by corresponding circular passage openings 16 formed in the main cam 5, thereby providing the above said rotationally locked and axially slidable connection between the main cam 5 and the revolving shaft assembly 3. Alternatively, the revolving shaft assembly 3 may comprise one single revolving shaft.

In accordance with an embodiment, the barrel shaped main cam 5 comprises an external circumferential cam surface 23 which extends around the revolving shaft assembly 3 and which forms the main cam profile 6. Main cam surface 23 is advantageously hardened (either chemically or by means of thermal treatment) in at least the zones intended to get into contact with the fixed main cam follower 7, so that wear takes place at the cam follower 7 which is easier and cheaper to replace than the main cam 5.

Analogously, the plate shaped secondary cam 8 comprises an external circumferential cam surface 24 which extends around the revolving shaft assembly 3 and which forms the secondary cam profile 9. Secondary cam surface 24 is also advantageously hardened (either chemically or by means of thermal treatment) in at least the zones intended to get into contact with the secondary cam follower 14, so that wear takes place at the cam follower 14 which is easier and cheaper to replace than the secondary cam 8.

In accordance with an embodiment, the secondary cam 8 is separately fabricated and rigidly connected, e.g. by means of screws, to the main cam 5. This allows repair and substitution of either of the cams 5, 8 independently from the other one.

In accordance with an alternative embodiment, the secondary cam 8 and the main cam 5 are integrally formed as a single piece.

Preferably, but not necessarily, the fixed main cam follower 7 and/or the secondary cam follower 14 comprise roller elements 25, 26 adapted to rollably engage the main and/or secondary cam profiles 6, 9 in order to reduce frictional resistance there between.

In accordance with an embodiment, device 1 comprises a cam coupling device 27 with a cam connecting portion 28 rigidly connectable, e.g. by means of screws, to the main cam 5, a slide connecting portion 29 rigidly connectable, e.g. by means of screws, to the main slide 11, as well as a ring bearing 30 interposed between cam connecting portion 27 and slide connecting portion 29 to enable them to rotate relative to one another around shaft rotation axis R and a locking means 31 configured to prevent relative translational movements of cam connecting portion 27 and slide connecting portion 29 in the direction of shaft rotation axis R.

The sliding support of main slide 11 with respect to the support structure 2 can be obtained by a main sliding guide 32 comprising at least two guide rails 33 rigidly connected to the support structure 2 and extending in a direction P (e.g. horizontal direction) parallel to shaft rotation axis R and at least two, preferably at least four guide members 34 rigidly connected to the main slide 11 and slidably or rollably shape coupled with guide rails 33 such that the main slide 11 can only translate in the direction parallel to shaft rotation axis R, while other translational and rotational movements of main slide 11 are impeded. Of course, the arrangement of guide rails 33 and guide members 34 might be inverted without changing the function thereof.

In order to assure an unequivocal translational positioning of main cam 5 and main slide 11 for a given rotational position of main cam 5, a main elastic element 35 is provided which acts between support structure 2 and main cam 5, so that the main cam profile 6 is continuously elastically biased in (rolling) contact with the fixed main cam follower 7.

The sliding support of the secondary slide 12 with respect to the main slide 11 can be obtained by a secondary sliding guide 36 comprising at least two guide rails 37 rigidly connected to the main slide 11 and extending in the transverse direction T (e.g. vertical direction) to shaft rotation axis R and at least two, preferably at least four guide members 38 rigidly connected to the secondary slide 12 and slidably or rollably shape coupled with guide rails 37 such that the secondary slide 12 can only translate in the transverse direction T to shaft rotation axis R, while other translational and rotational movements of secondary slide 12 with respect to main slide 11 are impeded. Of course, the arrangement of guide rails 37 and guide members 38 might be inverted without changing the function thereof.

In order to assure an unequivocal translational positioning of the secondary slide 12 in said transverse direction T for a given rotational position of secondary cam 8, a secondary elastic element 39, e.g. an elastic spring, is provided which acts between support structure 2 and secondary slide 12, so that the secondary cam follower 14 is continuously elastically biased in (rolling) contact with the secondary cam profile 9.

The tooling fixation portion 13 of secondary slide 12 is adapted to engage a tooling (which per se does not form part of the invention) intended to be moved synchronously and precisely timed in accordance with the above said cyclic main translational movement P and cyclic secondary translational movement T.

Advantageously but not necessarily, the cyclic main translational movement P takes place in a horizontal plane and the cyclic secondary translational movement T takes place in a vertical movement plane.

Figure 6:
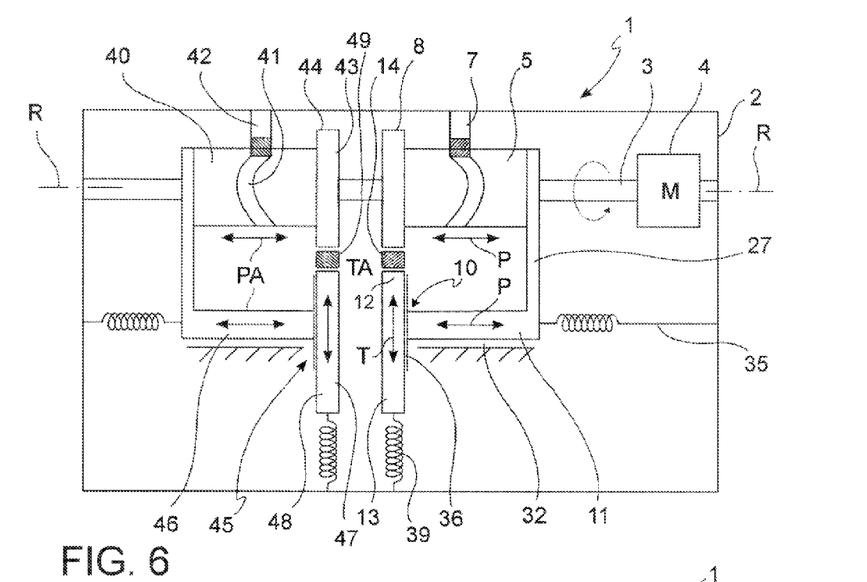

In accordance with an embodiment (FIG. 6), device 1 may further comprise:
  an additional barrel shaped main cam 40 connected in a slidable but rotationally locked manner with the revolving shaft assembly 3 such that the additional main cam 40 can slide along the revolving shaft assembly 3 in the direction of the shaft rotation axis R and rotates together with the revolving shaft assembly 3 around the shaft rotation axis R, wherein the additional main cam 40 comprises an additional main cam profile 41 extending around the revolving shaft assembly 3 and defining an additional stroke in the direction of the shaft rotation axis R,
  an additional fixed main cam follower 42 connected to the support structure 2 and configured to engage the additional main cam profile 41 of the additional main cam 40 in such a way that, in response to a rotation of the revolving shaft assembly 3 around the shaft rotation axis R, the additional main cam 40 performs an additional cyclic main translational movement PA in the direction of the shaft rotation axis R,
  an additional plate shaped secondary cam 43 rigidly connected to the additional main cam 40 in a manner that the additional secondary cam 43 rotates and translates together with the additional main cam 40, wherein the additional secondary cam 43 comprises an additional secondary cam profile 44 extending around the revolving shaft assembly 3 and defining an additional stroke in an additional transversal direction to the shaft rotation axis R,
  an additional tooling holder 45 comprising an additional main slide 46 supported by the support structure 2 in a manner that the additional main slide 46 can move in the direction of the shaft rotation axis R and an additional secondary slide 47 having an additional tooling fixation portion 48 and being connected to the additional main slide 46 in a manner that the additional secondary slide 47 can move with respect to the additional main slide 46 in the additional transversal direction to the shaft rotation axis R,
  wherein the additional main slide 46 is connected to the additional main cam 40 in a manner that the additional main slide 46 moves together with the additional main cam 40 in the direction of the shaft rotation axis R and the additional main cam 40 can rotate with respect to the additional main slide 46 around the shaft rotation axis R,
  an additional secondary cam follower 49 connected to the additional secondary slide 47 and configured to engage the additional secondary cam profile 44 of the additional secondary cam 43 in such a way that, in response to the rotation of the revolving shaft assembly 3 around the shaft rotation axis R, the additional secondary slide 47 performs an additional cyclic secondary translational movement TA in the additional transversal direction to the shaft rotation axis R synchronized with said additional cyclic main translational movement PA and with said main and secondary cyclic movements P, T.

In this embodiment, the additional transversal direction TA can coincide with the above said transversal direction T or the additional transversal direction TA can be different from the above said transversal direction T. The additional cams, cam followers, tooling holder and slides and their functional and structural relationships can be configured and embodied as already described with respect to the cams, cam followers, tooling holder and slides of the previous embodiment (FIGS. 1-3).

Figure 7:
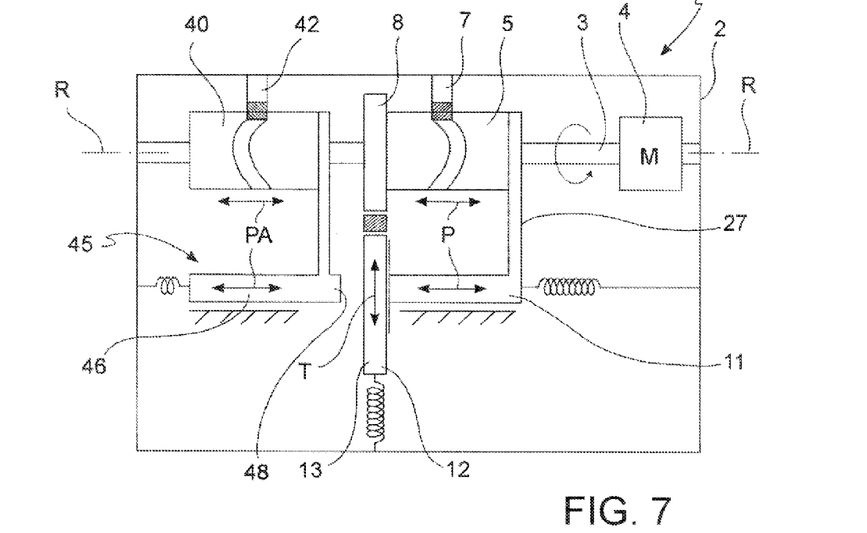

In accordance with a further embodiment (FIG. 7), device 1 may further comprise:
  an additional barrel shaped main cam 40 connected in a slidable but rotationally locked manner with the revolving shaft assembly 3 such that the additional main cam 40 can slide along the revolving shaft assembly 3 in the direction of the shaft rotation axis R and rotates together with the revolving shaft assembly 3 around the shaft rotation axis R, wherein the additional main cam 40 comprises an additional main cam profile 41 extending around the revolving shaft assembly 3 and defining an additional stroke in the direction of the shaft rotation axis R,
  an additional fixed main cam follower 42 connected to the support structure 2 and configured to engage the additional main cam profile 41 of the additional main cam 40 in such a way that, in response to a rotation of the revolving shaft assembly 3 around the shaft rotation axis R, the additional main cam 40 performs an additional cyclic main translational movement PA in the direction of the shaft rotation axis R,
  an additional tooling holder 45 comprising an additional main slide 46 having an additional tooling fixation portion 48 and being supported by the support structure 2 in a manner that the additional main slide 46 can move in the direction of the shaft rotation axis R, wherein the additional main slide 46 is connected to the additional main cam 40 in a manner that the additional main cam 40 can rotate with respect to the additional main slide 46 around the shaft rotation axis R and the additional main slide 46 moves together with the additional main cam 40 in the direction of the shaft rotation axis R synchronized with said main and secondary cyclic movements P, T.

Figure 2:
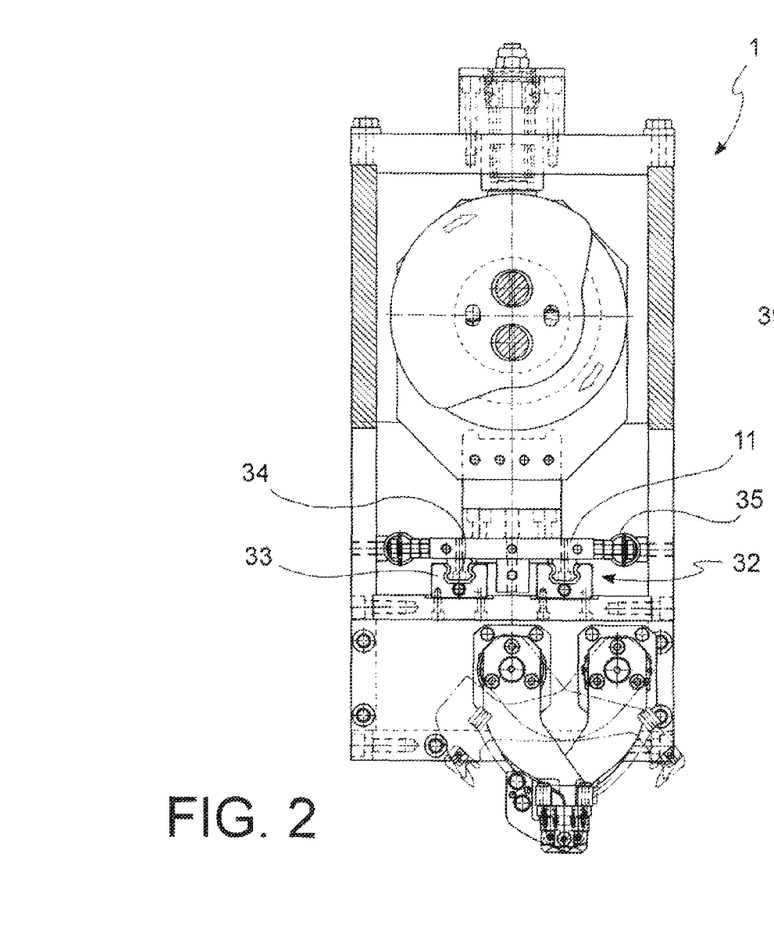
FIG. 2 is a schematic cross-sectional view according to sectional plane II-II in FIG. 1.
Figure 3:
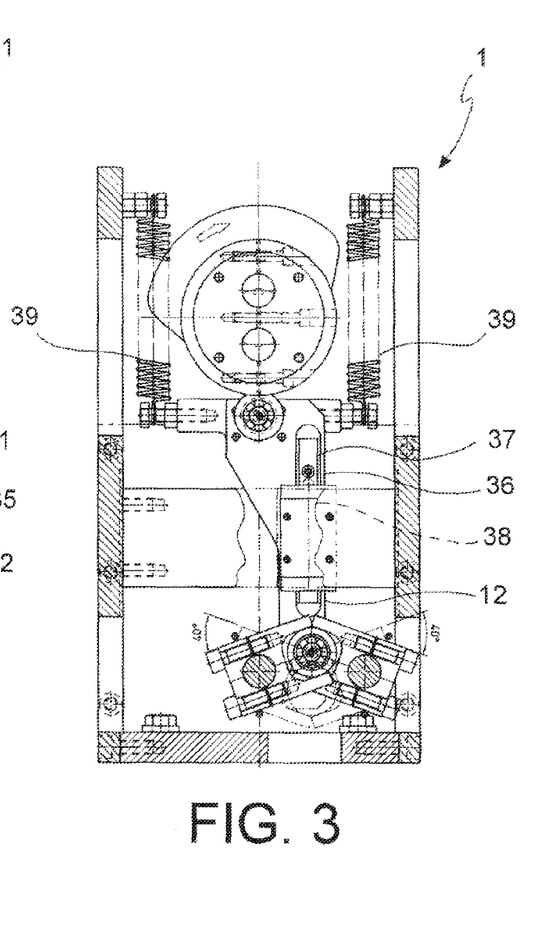
FIG. 3 is a schematic cross-sectional view according to sectional plane III-III in FIG. 1.
Figure 4:
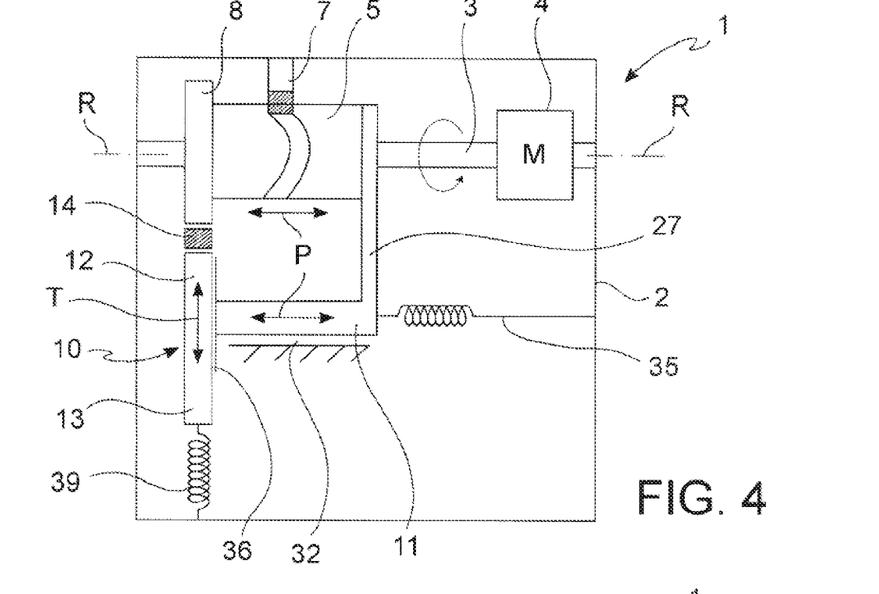
FIGS. 4-8 are schematic illustrations of devices for precisely manipulating objects according to further embodiments of the invention.

Also in this embodiment, the additional cams, cam followers, tooling holder and slides and their functional and structural relationships can be configured and embodied as already described with respect to the cams, cam followers, tooling holder and slides of the previous embodiment (FIGS. 1-3).

Figure 5:
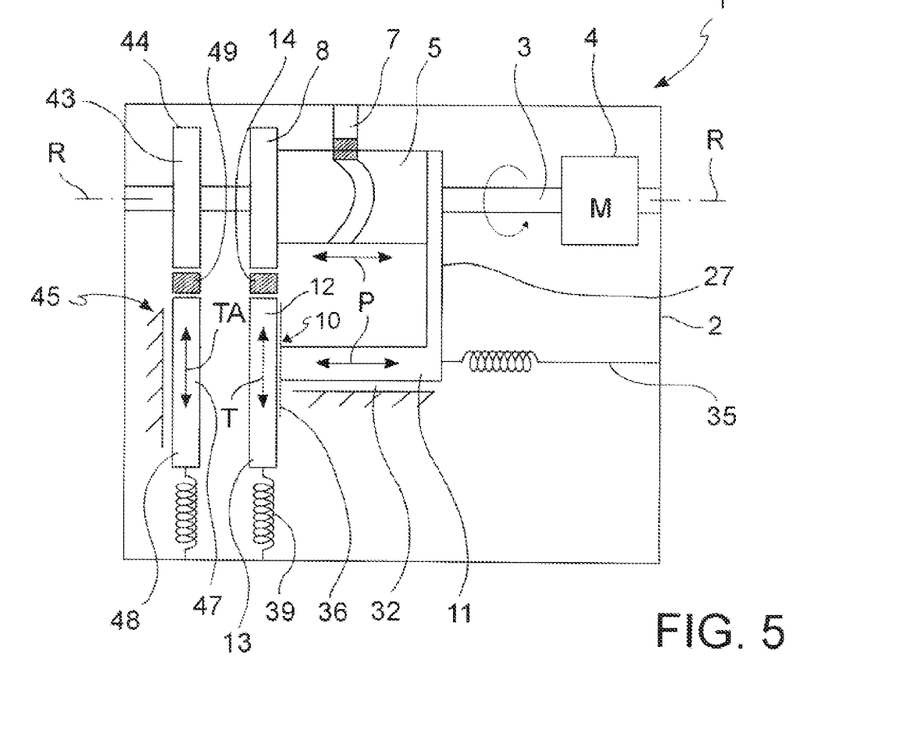

In accordance with a yet further embodiment (FIG. 5), device 1 may further comprise:

an additional plate shaped secondary cam 43 rigidly connected to the revolving shaft assembly 3 in a manner that the additional secondary cam 43 rotates together with the revolving shaft assembly 3, wherein the additional secondary cam 43 comprises an additional secondary cam profile 44 extending around the revolving shaft assembly 3 and defining an additional stroke in an additional transversal direction to the shaft rotation axis R, an additional tooling holder 45 comprising an additional secondary slide 47 having an additional tooling fixation portion 48 and being connected to the supporting structure 2 in a manner that the additional secondary slide 47 can move with respect to the supporting structure 2 in the additional transversal direction to the shaft rotation axis R, an additional secondary cam follower 49 connected to the additional secondary slide 47 and configured to engage the additional secondary cam profile 44 of the additional secondary cam 43 in such a way that, in response to the rotation of the revolving shaft assembly 3 around the shaft rotation axis R, the additional secondary slide 47 performs an additional cyclic secondary translational movement TA in the additional transversal direction to the shaft rotation axis R synchronized with said main and secondary cyclic movements P, T.

Also in this embodiment, the additional transversal direction TA can coincide with the above said transversal direction T or the additional transversal direction TA can be different from the above said transversal direction T. The additional cams, cam followers, tooling holder and slides and their functional and structural relationships can be configured and embodied as already described with respect to the cams, cam followers, tooling holder and slides of the previous embodiment (FIGS. 1-3).

Figure 8:
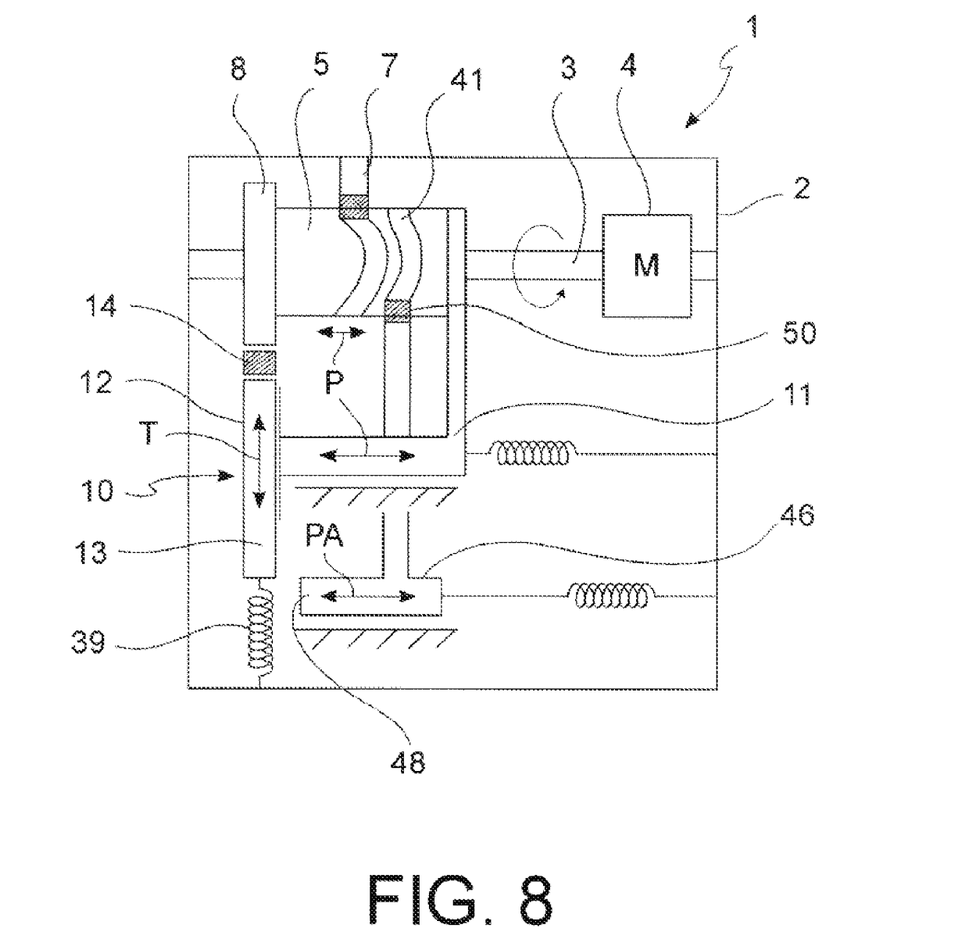

In accordance with a yet further embodiment (FIG. 8), device 1 may comprise:

an additional main cam profile 41 formed (as a two stage cam profile together with main cam profile 6) in the main cam 5 and extending around the revolving shaft assembly 3 and defining an additional stroke in the direction of the shaft rotation axis R, an additional main cam follower 50 connected to an additional main slide 46 of an additional tooling holder 45 and configured to engage the additional main cam profile 41 of the main cam 5 in such a way that, in response to a rotation of the revolving shaft assembly 3 around the shaft rotation axis R, the additional main cam follower 50 performs an additional cyclic main translational movement PA in the direction of the shaft rotation axis R, wherein the additional main slide 46 comprises an additional tooling fixation portion 48 and is supported by the support structure 3 in a manner that the additional main slide 46 can move in the direction of the shaft rotation axis R together with the additional main cam follower 50 synchronized with said cyclic main and secondary movements P, T.

Advantageously, support structure 2 comprises an enclosure housing 51 configured to seal lubricated parts of device 1 from an object manipulation space in which the timed and synchronized multidimensional tooling movements act, thereby preventing cross-contamination between the lubricated device components and the target of manipulation.

In accordance with an embodiment, the fixed main cam follower 7 is arranged at least partially outside the enclosure 51 for ease of maintenance and substitution.

Moreover, the timing belt 22 is preferably configured to provide a mechanical timing movement coupling interface for modular timed integration of device 1 in an industrial installation and process.

A preferable exemplary but non limiting use of device 1 is in a pick and place unit for assembling medical devices, such as syringes, IV Set, hypodermic needle, pen needle, IV catheter, etc.

It is further contemplated by the invention that a plurality of devices 1 are synchronized by a mechanically or electronically coupling of their respective drive means 4, in which each device 1 performs a distinct manipulating step.

It is further contemplated by the invention that a plurality of devices 1 is synchronized by a single common shaft assembly 3 along whose length a plurality of cam groups are mounted.

On the basis of the foregoing description and figures, the skilled person can appreciate that the device 1 according to the invention is particularly simple, low maintenance and structurally sturdy and enables high precision mechanically timed and synchronized multidimensional tooling movement, thanks to a direct mechanical reflection of the movement magnitude from the cam profiles to the tooling holder.

While the present invention has been illustrated by description of several embodiments and while the illustrative embodiments have been described in considerable detail, it is not the intention to restrict or in any way limit the scope of the appended claims to such detail.

I claim:

1. Device for precisely manipulating objects by means of multidimensional tooling movement cycles, comprising:

a support structure and a revolving shaft assembly supported by the support structure such that the revolving shaft assembly can rotate around a shaft rotation axis, drive means connected to the support structure and configured to co-operate with the revolving shaft assembly to rotate the revolving shaft assembly around the shaft rotation axis, a barrel shaped main cam connected in a slidable but rotationally locked manner with the revolving shaft assembly such that the main cam can slide along the revolving shaft assembly in the direction of the shaft rotation axis and rotates together with the revolving shaft assembly around the shaft rotation axis, wherein the main cam comprises a main cam profile extending around the shaft rotation axis and defining a main stroke in the direction of the shaft rotation axis, a fixed main cam follower connected to the support structure and configured to engage the main cam profile of the main cam such that, in response to a rotation of the revolving shaft assembly around the shaft rotation axis, the main cam performs a cyclic main translational movement in the direction of the shaft rotation axis, a plate shaped secondary cam rigidly connected to the main cam such that the secondary cam rotates and translates together with the main cam, said secondary cam comprising a secondary cam profile extending around the shaft rotation axis and defining a secondary stroke in a transversal direction to the shaft rotation axis, a tooling holder having a main slide supported by the support structure in a slidable and guided manner such that the main slide can move in the direction of the shaft rotation axis and a secondary slide including a tooling fixation portion and being connected to the main slide in a slidable and guided manner such that the secondary slide can move with respect to the main slide in a transversal direction to the shaft rotation axis, wherein the main slide is connected to the main cam integrally in translation along shaft rotation axis and rotatably around said shaft rotation axis such that said main slide moves together with the main cam in the direction of the shaft rotation axis while the main cam can freely rotate with respect to the main slide around the shaft rotation axis, a secondary cam follower connected to the secondary slide and configured to engage the secondary cam profile of the secondary cam in such a way that, in response to the rotation of the revolving shaft assembly around the shaft rotation axis, the secondary slide performs a cyclic secondary translational movement in the transversal direction to the shaft rotation axis synchronized with said main cyclic translational movement.

2. Device according to claim 1, in which said revolving shaft assembly comprises a plurality of parallel single rods extending along shaft rotation axis and spaced apart from one another transversely to shaft rotation axis, said rods having a substantially circular cross-section and being slidably received, with interposition of sliding bearings, by corresponding circular passage openings formed in said main cam.

3. Device according to claim 1, in which said drive means comprises a motor and a transmission for transmitting the rotational movement of a motor output shaft to the revolving shaft assembly.

4. Device according to claim 3, in which said transmission comprises a timing belt connected with a toothed gearing interposed between the motor output shaft and the revolving shaft assembly.

5. Device according to claim 1, in which said barrel shaped main cam comprises an external circumferential cam surface which extends around the revolving shaft assembly and which forms said main cam profile, wherein said main cam surface is hardened in at least the zones intended to get into contact with the fixed main cam follower.

6. Device according to claim 1, in which said secondary cam comprises an external circumferential cam surface which extends around the revolving shaft assembly and forms the secondary cam profile, wherein said secondary cam surface is hardened in at least the zones intended to get into contact with the secondary cam follower.

7. Device according to claim 1, in which said secondary cam is separately fabricated and rigidly detachably connected to the main cam.

8. Device according to claim 1, in which said secondary cam profile and said main cam profile are integrally formed in one or more common cam surfaces.

9. Device according to claim 1, in which the fixed main cam follower and the secondary cam follower comprise roller elements adapted to rollably engage the main and secondary cam profiles.

10. Device according to claim 1, comprising a cam coupling device having:
a cam connecting portion rigidly and detachably connectable to the main cam,
a slide connecting portion rigidly and detachably connectable to the main slide,
a ring bearing interposed between cam connecting portion and slide connecting portion to enable them to rotate relative to one another around shaft rotation axis,
a locking means configured to prevent relative translational movements of cam connecting portion and slide connecting portion in the direction of shaft rotation axis.

11. Device according to claim 1, comprising:
a main sliding guide comprising at least two guide rails rigidly connected to the support structure and extending in a direction parallel to shaft rotation axis and at least two guide members rigidly connected to the main slide and slidably or rollably shape coupled with guide rails such that the main slide can only translate in the direction parallel to shaft rotation axis, while other translational and rotational movements of main slide are impeded.

12. Device according to claim 1, comprising a main elastic element acting between said support structure and said main cam, so that the main cam profile is continuously elastically biased in contact with the fixed main cam follower.

13. Device according to claim 1, comprising a secondary sliding guide comprising at least two guide rails rigidly connected to the main slide and extending in the transverse direction to shaft rotation axis and at least two guide members rigidly connected to the secondary slide and slidably or rollably shape coupled with guide rails such that the secondary slide can only translate in the transverse direction to shaft rotation axis, while other translational and rotational movements of secondary slide with respect to main slide are impeded.

14. Device according to claim 1, comprising a secondary elastic element acting between support structure and secondary slide, so that the secondary cam follower is continuously elastically biased in contact with the secondary cam profile.

15. Device according to claim 1, further comprising:
an additional barrel shaped main cam connected in a slidable but rotationally locked manner with the revolving shaft assembly such that the additional main cam can slide along the revolving shaft assembly in the direction of the shaft rotation axis and rotates together with the revolving shaft assembly around the shaft rotation axis, wherein the additional main cam comprises an additional main cam profile extending around the revolving shaft assembly and defining an additional stroke in the direction of the shaft rotation axis,
an additional fixed main cam follower connected to the support structure and configured to engage the additional main cam profile of the additional main cam in such a way that, in response to a rotation of the revolving shaft assembly around the shaft rotation axis, the additional main cam performs an additional cyclic main translational movement in the direction of the shaft rotation axis,
an additional plate shaped secondary cam rigidly connected to the additional main cam in a manner that the additional secondary cam rotates and translates together with the additional main cam, wherein the additional secondary cam comprises an additional secondary cam profile extending around the revolving shaft assembly and defining an additional stroke in an additional transversal direction to the shaft rotation axis,
an additional tooling holder comprising an additional main slide supported by the support structure in a manner that the additional main slide can move in the direction of the shaft rotation axis and an additional secondary slide having an additional tooling fixation portion and being connected to the additional main slide in a manner that the additional secondary slide can move with respect to the additional main slide in the additional transversal direction to the shaft rotation axis, wherein the additional main slide is connected to the additional main cam in a manner that the additional main slide moves together with the additional main cam in the direction of the shaft rotation axis and the additional main cam can rotate with respect to the additional main slide around the shaft rotation axis, an additional secondary cam follower connected to the additional secondary slide and configured to engage the additional secondary cam profile of the additional secondary cam in such a way that, in response to the rotation of the revolving shaft assembly around the shaft rotation axis, the additional secondary slide performs an additional cyclic secondary translational movement in the additional transversal direction to the shaft rotation axis synchronized with said additional cyclic main translational movement and with said main and secondary cyclic movements.

16. Device according to claim 1, further comprising:

an additional barrel shaped main cam connected in a slidable but rotationally locked manner with the revolving shaft assembly such that the additional main cam can slide along the revolving shaft assembly in the direction of the shaft rotation axis and rotates together with the revolving shaft assembly around the shaft rotation axis, wherein the additional main cam comprises an additional main cam profile extending around the revolving shaft assembly and defining an additional stroke in the direction of the shaft rotation axis, an additional fixed main cam follower connected to the support structure and configured to engage the additional main cam profile of the additional main cam in such a way that, in response to a rotation of the revolving shaft assembly around the shaft rotation axis, the additional main cam performs an additional cyclic main translational movement in the direction of the shaft rotation axis, an additional tooling holder comprising an additional main slide having an additional tooling fixation portion and being supported by the support structure in a manner that the additional main slide can move in the direction of the shaft rotation axis, wherein the additional main slide is connected to the additional main cam in a manner that the additional main cam can rotate with respect to the additional main slide around the shaft rotation axis and the additional main slide moves together with the additional main cam in the direction of the shaft rotation axis synchronized with said main and secondary cyclic movements.

17. Device according to claim 1, further comprising:

an additional plate shaped secondary cam rigidly connected to the revolving shaft assembly in a manner that the additional secondary cam rotates together with the revolving shaft assembly, wherein the additional secondary cam comprises an additional secondary cam profile extending around the revolving shaft assembly and defining an additional stroke in an additional transversal direction to the shaft rotation axis, an additional tooling holder comprising an additional secondary slide having an additional tooling fixation portion and being connected to the supporting structure in a manner that the additional secondary slide can move with respect to the supporting structure in the additional transversal direction to the shaft rotation axis, an additional secondary cam follower connected to the additional secondary slide and configured to engage the additional secondary cam profile of the additional secondary cam in such a way that, in response to the rotation of the revolving shaft assembly around the shaft rotation axis, the additional secondary slide performs an additional cyclic secondary translational movement in the additional transversal direction to the shaft rotation axis synchronized with said main and secondary cyclic movements.

18. Device according to claim 1, further comprising:

an additional main cam profile formed as a two stage cam profile together with main cam profile in the main cam and extending around the revolving shaft assembly and defining an additional stroke in the direction of the shaft rotation axis, an additional main cam follower connected to an additional main slide of an additional tooling holder and configured to engage the additional main cam profile of the main cam in such a way that, in response to a rotation of the revolving shaft assembly around the shaft rotation axis, the additional main cam follower performs an additional cyclic main translational movement in the direction of the shaft rotation axis, wherein the additional main slide comprises an additional tooling fixation portion and is supported by the support structure in a manner that the additional main slide can move in the direction of the shaft rotation axis together with the additional main cam follower synchronized with said cyclic main and secondary movements.

* * * * *